3,614,864
TWO-PLY POLYAMIDE TIRE CORD
Berthold Daimler, Remscheid-Lennep, and Berd Jacobi, Wuppertal-Elberfeld, Germany, assignors to Glanzstoff AG, Wuppertal, Germany
Filed Nov. 21, 1969, Ser. No. 878,958
Claims priority, application Germany, Nov. 23, 1968, P 18 10 618.8
Int. Cl. D02g 3/28, 3/48
U.S. Cl. 57—140 R
10 Claims

ABSTRACT OF THE DISCLOSURE

A two-ply nylon tire cord in which the individual plies are pretwisted in the direction opposite to the after-twist of the plies in the finished cord, the pretwist being at least 200 turns/meter greater than the after-twist which should provide a twist factor $\alpha_m$ of the about 60 to 140. A plurality of such two ply cords are assembled into a rubber tire structure to provide improved performance characteristics.

---

Over recent years, tire cords produced from polyamide yarns or filaments have found widespread use, especially those produced from nylon-6,6 filaments or fibers. However, one serious disadvantage of this type of cord is the phenomenon known among experts as "flat-spotting." If a vehicle equipped with such reinforced tires is stopped after a journey during which the tires have increased in temperature, impressions or so-called "flat spots" are developed and fixed by the deformation to which the tires are subjected under the weight of the standing vehicle. When the vehicle begins moving again, it is some time before these impressions, reflected in a lack of complete roundness in the tire, disappear again. This is a very undesirable phenomenon both in terms of riding characteristics and also in terms of even wear on the tires.

Various attempts have been made to overcome or reduce this phenomenon, the most popular processes being those in which the initial ply yarns and/or the cords are subjected to a special heat treatment, usually accompanied by stretching. In all these experiments, however, appropriate measures must also be taken to ensure that other important properties of the cord are maintained within commercially acceptable limits. For example, such properties as tensile strength, elongation at break and standard elongation, fulling loss, growth and adhesion to rubber should not be altered by the heat treatment. Unfortunately, all previous efforts requiring this heat and stretching treatment have not met with any real success.

Accordingly, one object of the present invention is to provide a polyamide tire cord, preferably one composed of nylon-6,6 yarn plies, which has satisfactory general physical properties, which showns improved flat-spotting behavious, and which eliminates the need to heat-stretch the finished cord. Another object of the invention is to provide a rubber tire structure reinforced with a particular two-ply cord, e.g. where a large number of such cords are embedded in the tire carcass, so as to achieve the desired improvement in performance characteristics.

It has now been found in accordance with the invention that the properties of a two-ply tire cord, including resistance to flat-spotting, can be considerably improved and that the otherwise usually necessary after-heating and stretching of the completed cord structure can be eliminated in most cases, provided that the pre-twist of the individual base yarns or initial plies and the full twist of these plies into the completed cord are correctly coordinated with one another.

Thus, the present invention requires a two ply tire cord in which each individual base yarn or ply consists essentially of polyamide filament, wherein the finished or completed cord yarn has been given an after-twist of the individual plies corresponding to a twist factor $\alpha_m$ of from 60 to 140, the two initial plies or base yarns having been pretwisted in the opposite direction by 200 to 500 turns/meter greater than the after-twist of the plies in the finished cord.

The twist factor $\alpha_m$, sometimes called the "twist angle" is determined in accordance with the equation:

$$\alpha_m = n\sqrt{D/9000}$$

where $n=$ the twist in turns/meter, and $D=$ the yarn size of the cord in denier. The twist factor $\alpha_m$ is preferably about 85 to 130, and the amount by which the pretwist of the individual plies is greater than the full or final opposite twist of the cord is preferably from 300 to 450 turns/meter.

It will be understood that the pretwist of the individual polyamide yarns or plies can be accomplished in a conventional manner to provide a substantially uniform degree or amount of twist which is substantially equal in each ply. This pretwist may be made in either the S-direction or the Z-direction, provided that the two plies are then twisted together in the opposite direction to form the two-ply cord. Thus, the completed cord may be defined as having a cable twist of the S-Z type or the Z-S type. The present invention is not concerned with the particular methods employed for imparting a twist to the individual plies and the cord, but instead the invention does require a particular relationship betwen the pretwist of the plies and the after-twist of the finished cord as noted above.

The results of the invention are quite surprising, as will be recognized from the generally known and previously accepted relations set forth in the following discussion. Thus, elongation at break is known to increase with an increasing pretwist of the individual plies and with an increasing final twist or after-twist of the plies into the completed cord. The standard elongation likewise increases with greater pretwist or after-twist. On the other hand, tensile strength decreases with increasing after-twist, the influence of the pretwist on the tensile strength being less conspicuous. Any increase in the pretwist is considered to be accompanied by a marked deterioration in resistance to flat-spotting while also having an undesirable effect on growth. Hitherto, an $\alpha_m$ value of at least 160, preferably from 175 to 235, was regarded as being a necessary and essential condition for adequate fatigue strength. All of these known or previously accepted relationships and conditions failed to provide a solution to the serious problem of flat-spotting.

It was especially surprising that when the relations between the pretwist and final twist are selected in accordance with the invention, a polyamide tire cord is obtained which is not only completely adequate for practical application in terms of fatigue strength and adhesion to rubber but is also more favorable than so-called "standard cord" which has been widely adopted and which has an equal number of turns in its pretwist and final twist, especially in regard to flat-spotting, standard elongation and growth.

The so-called standard cord of polyamide, i.e. a two-ply cord in which the amount of pretwist and final twist are identical, each generally amounting to 500 turns/meter, is capable of approximating some of the cord properties of the present invention only when it has been stretched under heat subsequent to the cording or twisting operation. However, even in the absence of stretching under heat, the properties of the two-ply cord structure according to the present invention are better than those of a heated and stretched standard cord. In other words, heat-stretching does not afford any substantial advantage if applied to the cord of the invention. This means that it has now become possible, in accordance with the invention, to produce a cord which has the same properties as and in some respects better properties than the conventional heat-stretched standard cord, without requiring this new cord to be subsequently heated and stretched in a highly involved and technically difficult operation. This avoidance of an expensive processing step would be extremely important even if theer were no further improvement in properties such as resistance to flat-spotting.

The two-ply cords of the invention are incorporated as reinforcing elements into a rubber tire structure in the conventional manner, and the new cords are quite useful in combination with all natural or synthetic rubbers and all types of vehicular tires, i.e. automobile tires, truck tires, etc. For example, it is common to introduce a plurality of parallel tire cords into the tire carcass where they are adhesively embedded or bonded in a rubber or elastomeric layer. This parallel arrangement of a large number of individual cords, bonded in rubber, is generally preferred over a fabric or woven reinforcing cord structue in order to avoid abrasion or rubbing of one cord against another. In practice, there are usually at least two layers of rubber bonded cords in the tire carcass, these layers being referred to as "plies," e.g. as in a 2-ply tire, 4-ply tire or 8-ply tire. The so-called 2-ply tires have recently been found to be most useful for normal passenger car operation.

It should be noted that the terms "ply" and "plies" with reference to the individual cords have a precise and definite meaning directed to the number of base yarns or pretwisted threads which are then oppositely twisted together to form the cord. These same two terms are also applied to the layers of rubber bonded cords which make up the tire carcass or casing. Thus, a two-ply cord is made up of two pretwisted base yarns whereas a 2-ply tire has two layers of bonded cords.

The particular two-ply nylon cords of the present invention are preferably incorporated in the tire structure in accordance with conventional multi-layered structures or designs. Thus, it is possible to provide a so-called bias-ply tire in which the individual layers or plies of the tire casing cross at an angle with reference to the direction in which the parallel cords run. Radial-ply tires can also be fabricated in which the cords run straight across the width of the tire, usually in combination with an additional layer or rubber bonded sheet of fabric situated between the tire plies and the tread. The final tire is then composed of (1) the carcass containing two or more plies or layers of cord-reinforced rubber (2) the outer tread and (3) the bead such as a wire-reinforced edge which maintains the wheel on the rim.

Many variations can be made in the reinforced tire structure while still gaining a significant advantage from the specific tire cords disclosed herein. Thus, the total number of cords in each layer or ply of the tire, the size and strength of the individual cords and the specific properties of the polyamide filaments making up the base yarns can be adapted to the different requirements of particular vehicles. Of course, the advantages of the cords and tire structures of the present invention are most evident under extreme conditions of use, i.e. at high speeds, high temperatures and heavy duty operation followed by a period of standing where flat-spotting is most apt to develop. On the other hand, these problems are still sufficiently troublesome, especially in terms of a smoother and more comfortable ride, where the tires are to be used on passenger cars under normal traffic conditions or even on lighter weight vehicles. Certain advantages of the tire cords of the invention also indicate applications as reinforcing cords for other rubber structures, e.g. high speed belts or the like.

In the remaining disclosure, several examples are given in order to more fully demonstrate the advantages of the invention.

The difference between the two-ply cord structure according to the invention and the corresponding two-ply standard cord of the prior art is apparent from the following table. The yarn or filamentary material is nylon-6,6 (polyhexamethylene adipamide), each base yarn or initial thread ply having a size of 840 denier and being twisted into the two-ply cord in accordance with the specifications given in the table. The individual plies are first twisted in the S-direction, followed by a final twist to form the two-ply cord in the Z-direction. These directions of twist can be reversed without any substantial difference in results.

TABLE

|  | Cord according to the invention | | Standard cord | |
| --- | --- | --- | --- | --- |
| Hot stretching | Before | After | Before | After |
| Denier | 1,790 | 1,790 | 1,860 | 1,810 |
| Pretwist, turns/meter | 600 | 592 | 500 | 494 |
| Final twist, turns/meter | 200 | 205 | 500 | 493 |
| Tensile strength, Rkm.* | 74.3 | 67.3 | 70.5 | 66.2 |
| Elongation at break, percent | 22.8 | 21.5 | 26.3 | 23.1 |
| Standard elongation at 4.5 kilograms, percent | 8.2 | 8.1 | 10.0 | 9.2 |
| Flat-spotting | 1.3 | 1.4 | 1.65 | 1.65 |
| Fulling loss, percent | 15.8 | 15.8 | 8.5 | 8.5 |
| Growth, percent | 2.5 | 2.8 | 3.5 | 3.0 |
| Adhesion to rubber, kg./5 mm | 11–13 | 10–12 | 11–13 | 10–1g |

*Rkm.=Reiss-km.=9×grams/denier.

A further example of the invention is a nylon-6,6 cord which has a final twist of 300 turns/meter with a pretwist of 500 turns/meter. The cord has a size of 1780 denier, i.e. it consists of two base yarns or plies, each with a size of 840 denier. The base yarns are given an initial Z-twist of 500 turns/meter and are then corded together with a final S-twist of 300 turns/meter. The cord thus obtained has a tensile strength of 76.3 Rkm., a breaking elongation of 22.7%, a standard elongation of 8.3%, a flat-spotting value of 1.4, a fulling loss of 17.3%, a growth of 2.9% and an adhesion to rubber of 10 to 13 kg./5 cm..

As regards the optimum twist factor, sometimes called the twisting angle, it has been found that the desired improvement according to the invention occurs within the limits specified hereinabove. However, the most favorable twist factor $\alpha_m$ within these limits is governed to some extent by the yarn size. It has also been found that a number of factors inherent in the yarn material itself, e.g. the properties arising from the production of a filamentary polyamide, have an effect upon the choice of the correct twist factor which may outweigh and in some cases even conceal the dependence upon denier, i.e. yarn size.

In general, however, one can use conventional yarn sizes and numbers of individual filaments in each ply of the cord constructed in accordance with the invention. For example, suitable yarn sizes normally run from about 600 to 2500 denier. All of the above examples were carried out in accordance with standard tests prescribed in DIN 53 830, page 1: Testing of textiles; determination of linear density of single and plied yarns (real method).

DIN 53 832, page 1: Testing of textiles; determination of torsion of single and plied yarns as well as of variation in length when being untwisted (untwisting method).

DIN 53 815: Testing of textiles; tension testing definitions. Point 4.2.1.

DIN 53 834: Testing of textiles; tensile test for single and plied yarns. Points 9.1 and 9.4.

The flat spotting is described as follows:

The cord is loaded with 1.1 kp. at 26° C., then it is heated to 100° C. and finally cooled to 20° C. at the same load.

The elongation between the first and the last condition is given in flat spot percentages with the starting length as reference point.

The fulling loss was tested by AASTM Designation: 0885–59T, section 42. The fatigue resistance is described in the appendix: Method A: Compression—Firestone—Fatigue-Tester.

The growth is measured at 150° C. for a period of 30 minutes with a load of 1.6 kp. This elongation is given in growth percentage with the starting length as reference point.

The adhesion is measured in a rubber specimen of 5 mm. height. The cord vulcanized in this rubber specimen is pulled out of this specimen with a load, which gives a proportionality for the adhesion.

The invention is hereby claimed as follows:

1. A two-ply tire cord in which each individual ply consists essentially of a polyamide yarn initially pretwisted in one direction and in which the individual plies are finally twisted in the opposite direction to form the finished cord, the twist factor $\alpha_m$ of the finished cord having a value of approximately 60 to 140 and the individual plies having a pretwist of about 200 to 500 turns/meter greater than the after-twist of the plies in the finished cord.

2. A two-ply tire cord as claimed in claim 1 wherein the pretwist of the individual plies is about 300 to 450 turns/meter greater than the final after-twist.

3. A two-ply tire cord as claimed in claim 1 wherein the twist factor $\alpha_m$ of the finished cord is about 85 to 130.

4. A two-ply tire cord as claimed in claim 3 wherein the pretwist of the individual plies is about 300 to 450 turns/meter greater than the final after-twist.

5. A two-ply tire cord as claimed in claim 1 wherein the polyamide yarn is composed of nylon-6,6 filaments.

6. In a cord-reinforced rubber tire structure, the improvement which comprises a plurality of two-ply cords in which each individual ply consists essentially of a polyamide yarn intially pretwisted in one direction and in which the individual plies are finally twisted in the opposite direction to form the finished cord, the twist factor $\alpha_m$ of the finished cord having a value of approximately 60 to 140 and the individual plies having a pretwist of about 200 to 500 turns/meter greater than the after-twist of the plies in the finished cord.

7. A tire structure as claimed in claim 6 wherein the pretwist of the individual plies is about 300 to 450 turns/meter greater than the final after-twist.

8. A tire structure as claimed in claim 6 wherein the twist factor $\alpha_m$ of the finished cord is about 85 to 130.

9. A tiret structure as claimed in claim 8 wherein the pretwist of the individual plies is about 300 to 450 turns/meter greater than the final after-twist.

10. A tire structure as claimed in claim 6 wherein the polyamide yarn is composed of nylon-6,6 filaments.

References Cited

UNITED STATES PATENTS

| | | | |
|---|---|---|---|
| 2,235,867 | 3/1941 | Castricum et al. | 152—359 |
| 2,922,727 | 1/1960 | Levison | 57—140 R |
| 3,419,059 | 12/1968 | Bridge, Jr. | 152—359 |
| 3,459,251 | 8/1969 | Kibler | 57—140 X |
| 3,518,138 | 6/1970 | Hersh | 57—140 X |

JOHN PETRAKES, Primary Examiner

U.S. Cl. X.R.

152—359